(12) United States Patent
McCauley et al.

(10) Patent No.: US 9,652,610 B1
(45) Date of Patent: *May 16, 2017

(54) HIERARCHICAL DATA SECURITY MEASURES FOR A MOBILE DEVICE

(71) Applicant: Square, Inc., San Francisco, CA (US)

(72) Inventors: Nathan McCauley, San Francisco, CA (US); Robert Lee, San Francisco, CA (US); Oliver S. C. Quigley, San Francisco, CA (US); Eric Monti, San Francisco, CA (US); Michael R. Lewis, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,724

(22) Filed: Feb. 25, 2015

Related U.S. Application Data (63) Continuation of application No. 13/800,587, filed on Mar. 13, 2013, now Pat. No. 8,997,230.

(60) Provisional application No. 61/660,376, filed on Jun. 15, 2012.

(51) Int. Cl.
    *G06F 21/55* (2013.01)
    *G06F 21/56* (2013.01)

(52) U.S. Cl.
    CPC .......... *G06F 21/55* (2013.01); *G06F 21/554* (2013.01); *G06F 21/56* (2013.01); *G06F 2221/034* (2013.01)

(58) Field of Classification Search
    CPC ........ G06F 21/55; G06F 21/56; G06F 21/554; G06F 2221/034
    See application file for complete search history.

(56) References Cited

U.S. PATENT DOCUMENTS

| | | | |
|---|---|---|---|
| 5,394,395 | A | 2/1995 | Nagai et al. |
| 7,181,768 | B1 | 2/2007 | Ghosh et al. |
| 7,228,566 | B2 | 6/2007 | Caceres et al. |
| 7,840,763 | B2 | 11/2010 | Murotake et al. |
| 8,180,917 | B1 | 5/2012 | Yan et al. |
| 8,307,099 | B1 * | 11/2012 | Khanna ................... H04L 67/22 705/51 |
| 8,627,414 | B1 | 1/2014 | McCune et al. |
| 8,696,765 | B2 | 4/2014 | Mendez et al. |
| 8,805,865 | B2 | 8/2014 | Samari et al. |
| 8,826,426 | B1 | 9/2014 | Dubey |
| 8,875,286 | B2 | 10/2014 | Friedrichs et al. |

(Continued)

OTHER PUBLICATIONS

U.S. Appl. No. 14/709,250, of Zovi, D. D. et al., filed May 11, 2015.

(Continued)

*Primary Examiner* — Joseph P Hirl
*Assistant Examiner* — J. Brant Murphy
(74) *Attorney, Agent, or Firm* — Mattingly & Malur, PC (57) ABSTRACT

Methods, systems, and apparatus, including computer programs encoded on a computer storage medium, for determining, at a remote computing device, whether a first security measure has been compromised, wherein the first security measure is executed on a mobile device; and based on a determination that the first security measure has been compromised, performing a corrective measure, wherein the corrective measure is performed after a delay.

23 Claims, 6 Drawing Sheets

(56) References Cited

U.S. PATENT DOCUMENTS

| | | | |
|---|---|---|---|
| 8,925,092 | B1 | 12/2014 | Johansson et al. |
| 8,997,230 | B1 | 3/2015 | McCauley et al. |
| 2001/0020211 | A1 | 9/2001 | Takayama et al. |
| 2002/0120871 | A1 | 8/2002 | Watkins et al. |
| 2002/0194490 | A1 | 12/2002 | Halperin et al. |
| 2003/0014664 | A1 | 1/2003 | Hentunen |
| 2004/0030912 | A1 | 2/2004 | Merkle, Jr. et al. |
| 2004/0141547 | A1 | 7/2004 | Paquelet |
| 2005/0183072 | A1 | 8/2005 | Horning et al. |
| 2005/0278535 | A1* | 12/2005 | Fortune ............ G06F 8/61 713/176 |
| 2006/0036670 | A1* | 2/2006 | Musman .......... H04L 41/044 709/202 |
| 2006/0156011 | A1 | 7/2006 | Masui |
| 2006/0164213 | A1* | 7/2006 | Burghard ......... H04W 40/248 340/10.2 |
| 2006/0282660 | A1 | 12/2006 | Varghese et al. |
| 2007/0174910 | A1* | 7/2007 | Zachman ........... G06F 21/53 726/18 |
| 2007/0240219 | A1 | 10/2007 | Tuvell et al. |
| 2007/0271457 | A1 | 11/2007 | Patil et al. |
| 2008/0091681 | A1 | 4/2008 | Dwivedi et al. |
| 2009/0015418 | A1 | 1/2009 | Koike |
| 2009/0253408 | A1* | 10/2009 | Fitzgerald ......... G06F 21/316 455/411 |
| 2010/0107245 | A1* | 4/2010 | Jakubowski ....... G06F 21/52 726/22 |
| 2011/0047620 | A1* | 2/2011 | Mahaffey .......... G06F 21/564 726/23 |
| 2011/0078791 | A1 | 3/2011 | Prakash et al. |
| 2011/0093920 | A1* | 4/2011 | Etchegoyen ....... G06F 21/121 726/3 |
| 2011/0214184 | A1 | 9/2011 | Whitehouse et al. |
| 2011/0247045 | A1 | 10/2011 | Rajagopal et al. |
| 2011/0265182 | A1 | 10/2011 | Peinado et al. |
| 2011/0314145 | A1 | 12/2011 | Raleigh et al. |
| 2012/0144493 | A1 | 6/2012 | Cole et al. |
| 2012/0167162 | A1* | 6/2012 | Raleigh ............. G06F 21/57 726/1 |
| 2012/0210423 | A1* | 8/2012 | Friedrichs ......... H04L 63/1416 726/22 |
| 2012/0216242 | A1 | 8/2012 | Uner et al. |
| 2012/0311322 | A1* | 12/2012 | Koyun ............. G06Q 20/3227 713/156 |
| 2012/0324557 | A1* | 12/2012 | Rubin ............................. 726/7 |
| 2012/0331553 | A1 | 12/2012 | Aziz et al. |
| 2013/0097652 | A1 | 4/2013 | Bhattacharjee et al. |
| 2013/0111591 | A1* | 5/2013 | Topan ............... G06F 21/563 726/24 |
| 2013/0117854 | A1 | 5/2013 | Britton et al. |
| 2013/0305368 | A1 | 11/2013 | Ford |
| 2013/0312098 | A1* | 11/2013 | Kapoor ............. G06F 21/56 726/24 |

OTHER PUBLICATIONS

Bukszpan, D., "How Credit Card Companies Detect Fraud," CNBC.com, Published Mar. 30, 2012, Retrieved from the Internet URL: http://www.cnbc.com/id/46907307, on Nov. 7, 2014, 5 pages.

Herigstad, S., "Credit Card Issuers Know More Thank You Think," CreditCards.com, Published Jul. 3, 2008, Retrieved from the Internet URL: http://www.creditcards.com/credit-card-news/herigstad-credit-card-companies-monitor-purchases-1294.php, on Nov. 7, 2014, 5 pages.

U.S. Appl. No. 13/800,670 of McCauley, N. et al. filed Mar. 13, 2013.

Non-Final Office Action mailed Aug. 13, 2014, U.S. Appl. No. 13/800,587 of McCauley, N. et al. filed Mar. 13, 2013.

Notice of Allowance mailed Jan. 22, 2015, U.S. Appl. No. 13/800,587 of McCauley, N. et al. filed Mar. 13, 2013.

Non-Final Office Action mailed Mar. 3, 2015, U.S. Appl. No. 13/800,670 of McCauley, N. et al. filed Mar. 13, 2013.

Final Office Action mailed Sep. 11, 2015, for U.S. Appl. No. 13/800,670, of McCauley, N., et al., filed Mar. 13, 2013.

Advisory Action mailed Jan. 20, 2016, for U.S. Appl. No. 13/800,670, of McCauley, N., et al., filed Mar. 13, 2013.

\* cited by examiner

FIG. 7

HIERARCHICAL DATA SECURITY MEASURES FOR A MOBILE DEVICE

CROSS REFERENCE TO RELATED APPLICATIONS

This is a continuation of U.S. patent application Ser. No. 13/800,587, filed on Mar. 13, 2013, which claims the benefit of U.S. provisional patent application No. 61/660,376, filed on Jun. 15, 2012, both of which are incorporated herein by reference in their entirety.

BACKGROUND

This specification relates to data security.

The number of mobile devices, e.g., laptops, tablet computers, smart phones, etc., has increased over recent years. These mobile devices can be used for a variety of purposes. These purposes can include handling or processing sensitive or private user information. For example, mobile devices can be configured to run online banking applications and applications that allow users to make or receive mobile payments. These types of applications can have access to a user's private or sensitive information, such as, for example, bank account numbers, credit card numbers, Personal Identification Numbers (PINs) associated with smart cards and/or debit cards, and other banking information.

Some mobile devices can include hostile or malicious software applications or processes (e.g., malware) that attempt to compromise the applications executed on the mobile device. For example, a malicious software developer (sometimes referred to as a "hacker") or user can install malicious software libraries on a mobile device or can attempt to modify applications to gain access to the user's private or sensitive information.

SUMMARY

This specification describes techniques for providing data security on a mobile device, including techniques for providing a hierarchy of data security measures on a mobile device.

One issue is detecting that a mobile device has been compromised. Although the presence of malicious software can modify some characteristics of an application environment, these characteristics can also vary depending on the version of the operating system. However, by accumulating data regarding the application environment from a large number of mobile devices, anomalous characteristics (and therefore potentially compromised mobile devices) can be identified.

Another issue is that a hacker can react to corrective actions, e.g., by modifying the malicious software to avoid the feature that triggers the corrective action. However, by deliberately introducing a delay between the trigger and the corrective action, identification of the feature that triggers the corrective action becomes more difficult for the hacker.

In general, one aspect of the subject matter described in this specification may be embodied in methods that include the actions of storing a plurality of stored fingerprints, wherein each of the stored fingerprints is associated with a respective software environment and a respective mobile device; receiving from a first mobile device a first fingerprint of a first software environment in the first mobile device; determining whether the stored fingerprints include less than a threshold amount of fingerprints identical to the first fingerprint; based on a determination that the stored fingerprints include less than the threshold amount of fingerprints identical to the first fingerprint, determining that the first software environment is a compromised software environment; and performing a corrective measure.

Implementation may include one or more of the following. The threshold amount is a percentage. Determining whether the stored fingerprints include less than the threshold amount includes calculating an amount of stored fingerprints that are identical to the first fingerprint. Storing a set of unique fingerprints, storing an amount of stored fingerprints identical to each unique fingerprint from the set of unique fingerprints. Comparing the first fingerprint to the set of unique fingerprints and determining whether the first fingerprint matches a unique fingerprint from the set of unique fingerprints. Determining whether the stored fingerprints include less than the threshold amount includes determining the amount associated with the unique fingerprint. Determining whether the stored fingerprints include less than the threshold amount includes determining a frequency that the first fingerprint is identical to fingerprints from an install base, where the install base comprises identical user devices that execute identical operating systems and identical versions of the software applications. At least a subset of stored fingerprints represent valid software environments. The corrective measure includes disabling an account associated with a user, disabling an account associated with the first mobile device, or performing risk evaluation. Delaying the performance of the corrective measure until a predetermined amount of time has elapsed or a pseudo-random amount of time has elapsed. Delaying the performance of the corrective measure until a predetermined number of requests from the mobile device have been received or a pseudo-random number of requests from the mobile device have been received. The first fingerprint is a CRC, a cryptographic hash function, or sampling of the first software environment. The first software environment comprises software libraries associated with a mobile operating system, wherein the mobile operating system is associated with the first mobile device. The stored fingerprints further include less than the threshold percentage of fingerprints substantially similar to the first fingerprint. The compromised software environment comprises a malicious software component.

In general, another aspect of the subject matter described in this specification may be embodied in methods that include the actions of determining, at a remote computing device, whether a first security measure has been compromised, wherein the first security measure is executed on a mobile device; and based on a determination that the first security measure has been compromised, performing a corrective measure, wherein the corrective measure is performed after a delay.

Implementation may include one or more of the following. The delay comprises a predetermined amount of time or a pseudo-random amount of time. Receiving a type of security failure and calculating the delay based on the type of security failure. Calculating the delay includes a pseudo-random contribution to the amount of time. Calculating the delay, starting a timer, and performing the corrective measure when the timer expires. Calculating the delay, determining a current time from a clock, adding the delay to the current time to determine a delayed time, and performing the corrective measure when the clock reaches the delayed time. The predetermined delay comprises a predetermined number of requests from the mobile device or a pseudo-random number of requests from the mobile device. Determining, at the remote computing device, whether a second security measure has been compromised, wherein the second security measure is executed on the mobile device; based on a determination that the first security measure or the second security measure have been compromised, performing the corrective measure, wherein the corrective measure is performed after the predetermined delay. The corrective measure comprises disabling an account associated with a user, disabling an account associated with the first mobile device, or performing risk evaluation. The first security measure and the second security measure are associated with a hierarchy of security measures and wherein the second security measure is associated with a higher level of security than the first security measure. Determining whether a first security measure has been compromised includes receiving an indication from the mobile device that an application in the mobile device can access a memory location outside of allocated memory for the application. Determining whether a first security measure has been compromised includes determining whether stored fingerprints include less than a threshold amount of fingerprints identical to a first fingerprint received from the mobile device. Determining whether a first security measure has been compromised includes determining whether a fingerprint of an application on the mobile device matches a stored fingerprint for the application. Determining whether a first security measure has been compromised includes receiving an indication from the mobile device that a debugging mode is active.

Other embodiments of this aspect include corresponding systems, apparatus, and computer programs, configured to perform the actions of the methods, encoded on computer storage devices.

Potential advantages of implementations may include one or more of the following. Security measures can determine if the operating system or software application has been compromised (e.g., hacked or modified). If the security measures detect a compromised operating system or that the software application has been compromised, the security measures can alert a host system. The security measures can deauthorize the software application such that the software application no longer is able to interact with the host system. Multiple security measures can be combined to increase the overall security of the application.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
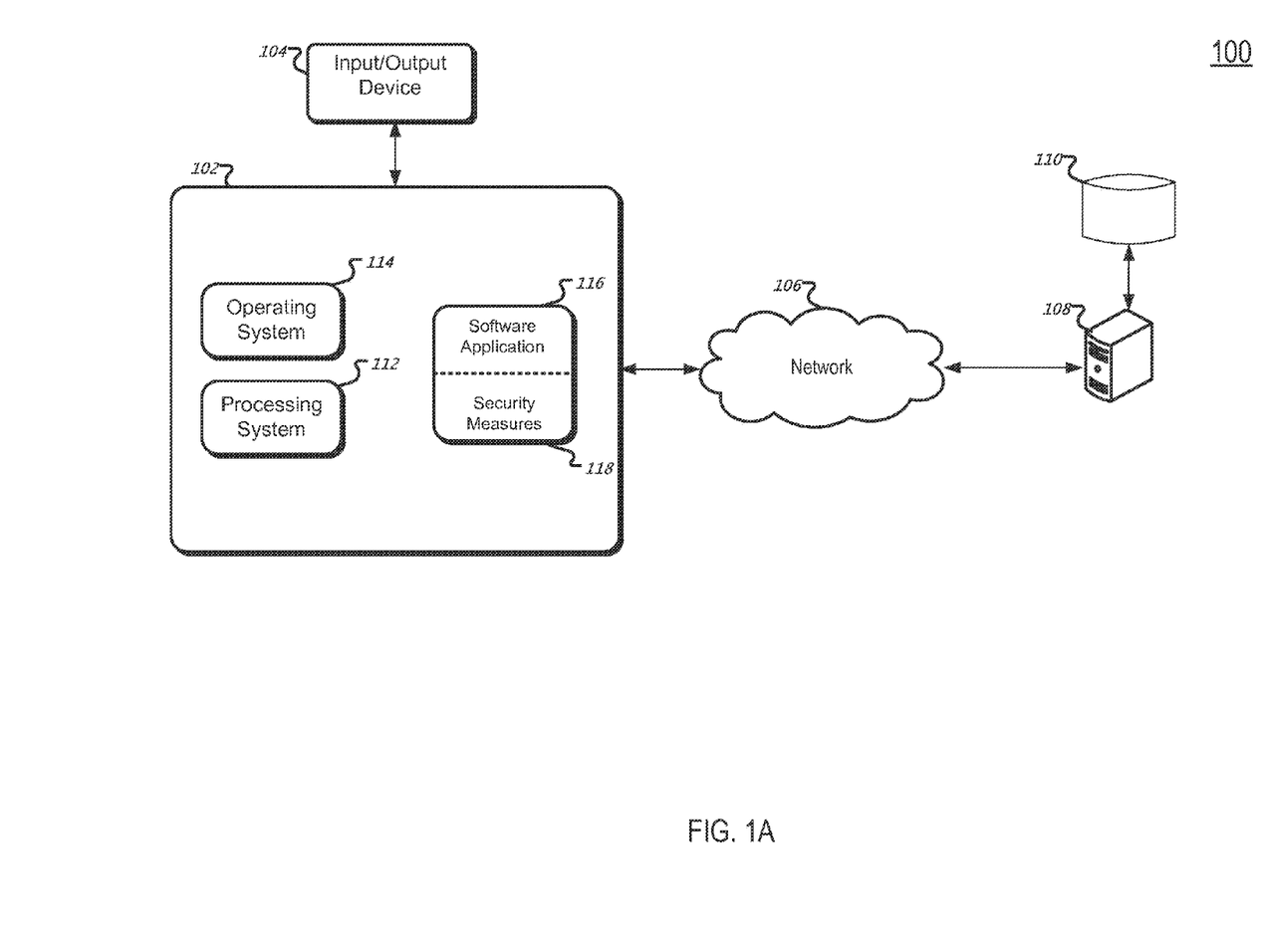
FIG. 1A is a block diagram of an example system that includes a hierarchy of data security measures.

FIG. 1A is a block diagram of an example system 100 that includes a hierarchy of data security measures. The example system 100 includes a user device 102, an input/output device 104, a network 106 and a host system 108.

The user device 102 can be any appropriate type of mobile data processing apparatus that can access or interact with the host system 108 through the network 106. For example, the user device 102 can be a laptop, a tablet computer, a network accessible phone, e.g., a smartphone, and so on. The user device 102 can include various hardware and software components. For example, the user device 102 can include a processing system 112, an operating system 114 and a software application 116 that includes or is associated with one or more security measures 118.

The processing system 112 can include various hardware components and be configured to execute the operating system 116. For example, the processing system 112 can include a processor, such as, for example, an ARM-based processor or a Digital Signal Processor. The processing system 112 can also include a communication module, e.g., a wireless internet module, a Bluetooth module, etc., for transmitting and/or receiving data from other user devices 102 or from the host system 108. The processing system 112 can also include an input/output module to receive user inputs, e.g., touch screen inputs, interactions with physical buttons or switches on the user device 102, and can receive input from one or more data ports or connectors, e.g., Universal Serial Bus (USB) ports, Apple Inc.'s 30 pin connector and an audio port, such as a headphone jack. Similarly, the input/output module can output data via a display associated with the user device 102, a speaker included in the user device 102, the audio port, etc. In some implementations, the processing system 112 is a system on a chip.

The operating system 114 can be any appropriate operating system. For example, the operating system 114 can be an operating system to be executed on a mobile device, such as, for example, Apple Inc.'s iOS, Google's Android operating system, an embedded Linux operating system, etc. The operating system 114 can allow for software applications 116 to be installed on the user device 102 and can execute the software applications 116. The operating system 114 can manage resources available to a software application 116. For example, the operating system 114 can sandbox a software application 116 such that each software application 116 installed on the user device 102 has limited access to various hardware and/or software resources, e.g., software libraries, databases, memory, frame buffers, network interfaces, etc. The operating system 114 can sandbox a software application 116 by controlling permissions for the software application 116 to system functions or by preventing access to other software applications.

The software application 116 can be various types of software executed by the operating system 114. For example, the software application 116 can be a mobile payment application that can receive or access credit card data and allows a user to transfer funds from an account associated with the user or receive funds from another user. The software application 116 can access or interact with components of the operating system 114. For example, the software application 116 can interact with operating system libraries 122 (see FIG. 1B), such as, for example, a library including functions to read data received at a data port or through a communication interface.

Figure 1B:
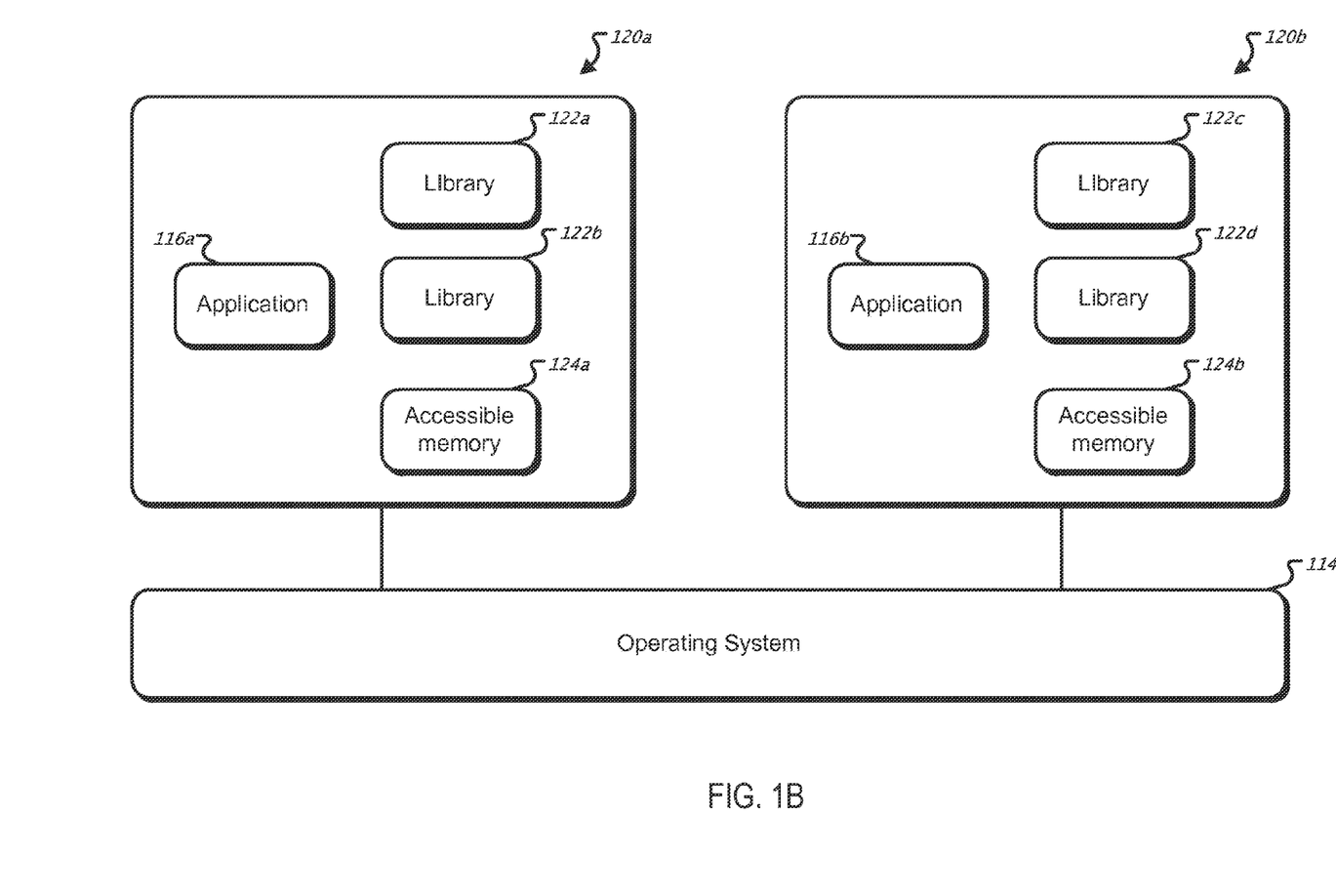
FIG. 1B is a block diagram of example sandboxed applications.

As described above, the software application 116 can be sandboxed such that the software application 116 has limited access to various hardware and/or software resources. FIG. 1B is a block diagram of example sandboxed applications 116a and 116b. Each sandboxed application is executed within a sandbox environment 120. For example, the application 116a is executed within the sandbox environment 120a, and the application 116b is executed within the sandbox environment 120b. Each application 116a, 116b can interact with hardware and software resources made available to the respective application by the operating system 114. For example, the application 116a can interact with software libraries 122a and 122b and interact with a portion of memory 124a that has been allocated for the application's use ("allocated memory"). Similarly, the application 116b can interact with software libraries 122c and 122d and a portion of memory 124b that has been allocated for the application's use. The software libraries 122a-d can be libraries included or associated with the operating system 114, e.g., libraries that are installed with or shipped with the operating system 114, or can be libraries associated with the applications 116a,116b, e.g., libraries that are installed or associated with the applications 116a,116b. On the other hand, the operating system 114 can interact with the components in either sandbox environment 120a, 120b.

Although the applications 116a and 116b can interact with the hardware and software resources included or available in the sandbox environments 120a, 120b, respectively, the applications 116a and 116b cannot interact with resources not included in the sandbox environments 120a, 120b. For example, under normal circumstances, e.g., a properly running or uncompromised operating system, the application 116a cannot interact or access the portion of memory 124b that is allocated to application 116b. However, if the operating system is compromised, i.e., the operating system has been hacked or protective measures associated with the operating system have been defeated, the application 116a can interact or access hardware and/or software resources outside of the sandboxed environment 120a. A "jailbroken" iOS device and a rooted Android OS device are examples of user devices that include a compromised operating system.

Returning to FIG. 1, one or more of the software applications 116 can be associated with or can include security measures 118. The security measures 118 can be software routines or libraries that can protect sensitive or private user data accessed by the application 116 and can determine whether the user device 102 or the software application 116 has been compromised. For example, as further explained below, the security measures 118 can determine if the operating system has been compromised (e.g., hacked or modified). In addition, the security measures 118 can determine if the software application 116 has been compromised. If the security measures 118 detect a compromised operating system or that the software application has been compromised, the security measures 118 can alert the host system 108.

In addition, the security measures 118 can be organized in a hierarchical manner such that multiple security measures can be combined to increase the overall security of the application. In some implementations, the first level of security detects whether the operating system has been compromised, the second level of security detects whether the environment in which the application executes has been compromised, e.g., whether the sandbox environment includes unexpected software, and the third level of security detects whether the application itself has been compromised, e.g., the application has been modified or corrupted. This does not imply any particular order in which the securities measures are performed.

In some implementations, the security measures 118 can be organized in a hierarchical manner such that the amount of security provided by each security measure increases. For example, the security measures 118 can be organized such that the first security measure provides for a first level of assurance that an application hasn't been compromised. A first security measure can provide a basic level of assurance and the second security measure provides for a greater level of assurance.

Returning to FIG. 1, the input/output device 104 can be a separate hardware component that interacts with the user device 102. For example, the input/output device 104 can be a credit card reader and/or a smart card/smart chip reader that can read information stored in a credit card's magnet stripe or information stored in the smart card. The input/output device 104 can communicate with the user device 102 via the audio port or other data connector included in the user device 102, or via a wireless connection such as Bluetooth. For example, a card reader and/or a smart card/smart chip reader can include a 3.5 mm connector that can be inserted into the user device's headphone jack and can provide the information read from a credit card or smart card to the user device 102 or an application executed on the user device 102. The input/output device 104 can communicate with the user device 102 using other communication or data ports included in the user device 102.

The network 106 can be any type of network, e.g., a local area network (LAN), wide area network (WAN), the Internet, a cellular network or a combination hereof. The network 106 facilitates connectivity between the user device 102 and the search system 106.

The host system 108 can be a computing apparatus such as a computer system similar to a server, workstation or personal computer. The host system 108 can communicate with a software application 116 and/or a user device 102 via the network 116. For example, the host system 108 can receive messages from the software application 116 executing on the user device 102. The messages can indicate that the security measures 118 have detected that the operating system 114 and/or application 116 have been compromised. In response, the host system 108 can implement or take corrective measures to prevent sensitive data or personal data associated with the application from being stolen or accessed. Example corrective measures are further explained below in connection with FIGS. 2-5.

The host system 108 can also include a database or storage device 110. The database 110 can be any appropriate type of memory or storage device. The database 110 can store various data, such as, fingerprints of execution environments that are received from user devices 102, which are described below.

Figure 2:
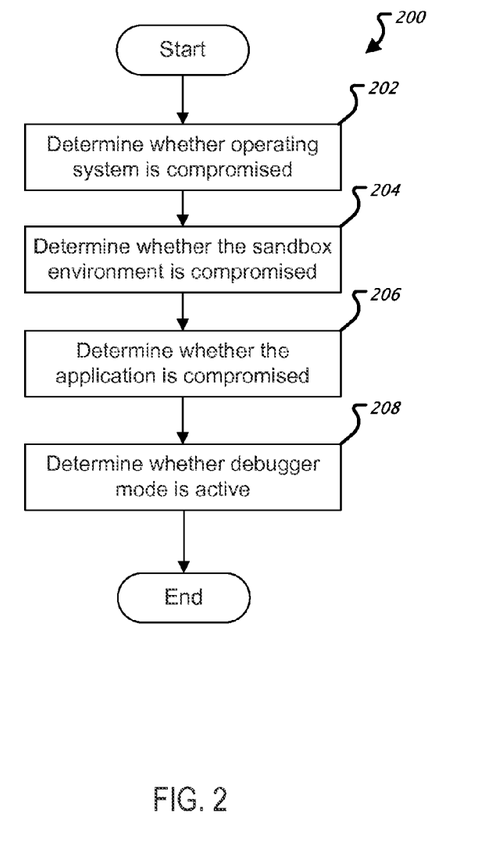
FIG. 2 is a flowchart of an example process for providing data security.

FIG. 2 is a flowchart of an example process 200 for providing data security. Although the example process 200 is illustrated and described with steps 202, 204, 206, 208 in a particular order, other orders are possible, and some steps could be performed simultaneously.

In the example, the process 200 begins by determining whether the operating system is compromised (at 202). For example, a security measure 118 associated with a software application 116, e.g., a mobile payment application, can include a first security measure 118 that determines whether the operating system 114, in which the software application is executed, is compromised.

The security measure 118 can use various techniques to determine whether the operating system 114 is compromised. For example, the security measure 118 can determine if the operating system 114 is compromised by attempting to access a memory location outside of the application's allocated memory 124a (e.g., read from or write to memory outside of the allocated memory 124a). If the security measure 118 can access the memory location (e.g., access files or execute other programs) outside of the allocated memory 124a then the security measure 118 can determine that the operating system 114 has been compromised.

If the security measure 118 determines that the operating system has been compromised, the security measure 118 can provide a message to the host system 108. The message can indicate that the operating system 114 on the user device 102 has been compromised. In response, the host system 108 can take corrective measures to protect the sensitive data or private data stored on the user device 102 or associated with the user of the user device 102 (e.g., credit card numbers, security access codes, etc.). For example, the host system 108 can deauthorize the software application 116 such that the software application 116 no longer is able to interact with the host system 108 and/or continue to operate. As another example, the host system 108 can report the mobile device as compromised to a cellular carrier and the cellular carrier can deactivate access of the mobile device to the cellular network.

Other corrective measures can be performed. For example, after detecting that the operating system 114 has been compromised, the host system 108 can disable user accounts associated with the application 116. In some implementations, the host system 108 can disable user accounts associated with a unique identifier associated with the user device 102, e.g., a phone 10, such that the user account cannot interact with the host system 108 (e.g., cannot receive or transfer funds). Another example corrective measure is to require human verification of the user associated with the user device 102. For example, after detecting that the operating system 114 has been compromised, the host system 108 can disable/deauthorize the software application, disable the user accounts associated with the user device 102 and require the user to contact the developer of the software application (or an associated customer support entity), request evidence of user business activity (e.g., invoices), or request data verifying user identity (e.g., address, phone number).

In some implementations, the host system 108 can delay the execution or performance of corrective measure to remove temporal locality of the corrective measure from the detection of the compromised operating system. For example, the host system 108 can wait an amount of time before executing the corrective measure. This deliberate delay should be distinguished from delays inherent in performing the corrective action, e.g., due to time required for messages to transit a network. For example, the host system 108 can calculate a delay time, set a timer, and perform the corrective measure when the timer reaches the delay time. As another example, the host system 108 can calculate a delay time, determine a current time from a host system clock, add the delay time to the current time to determine the time to perform the corrective action, and perform the corrective measure when the clock reaches the delay time. The delay time, for example, can be hours or days. This delay can increase the overall security of the sensitive data because the delay can remove or obscure the causality of detecting the compromised operating system and the execution of the corrective measure.

The amount of time can be predetermined, or can be a random or pseudo-random amount of time. The amount of time can also be a function of the triggering action, e.g., the amount of time can depend on which or how many of steps 202-208 indicate that the mobile device is compromised. If the host system 108 receives additional indications that the mobile device is compromised, then the amount of time can be adjusted.

Figure 3:
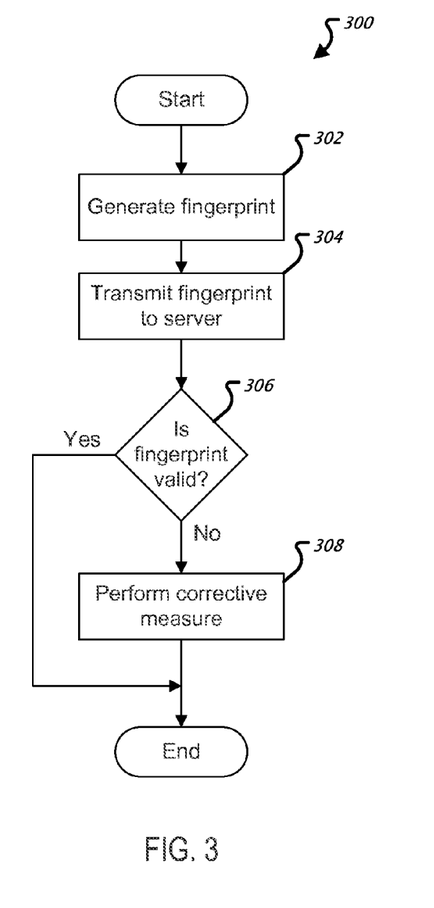
FIG. 3 is a flowchart of an example process to determine whether a sandbox environment has been compromised.

Process 200 continues by determining whether the sandbox environment 120a has been compromised (at 204). For example, the security measure 118 can calculate a fingerprint of the sandbox environment 120a in which the software application 116a executes. An example process 300 to determine whether the sandbox environment has been compromised is illustrated in FIG. 3.

Process 300 begins by generating a fingerprint of the sandbox environment 120a (at 302). For example, the security measure 118 can calculate a fingerprint of the software resources included in the sandbox environment 120a (e.g., software libraries 122, allocated memory 124 and the application 116). The security measure 118 can calculate the fingerprint using various error detection techniques. The security measure 118 can obtain data regarding the software resources included in the sandbox environment 120a, e.g., the name, size and/or memory location of the resources, and then apply a hash function to the data to generate the fingerprint. For example, the security measure 118 can apply cyclic redundancy check ("CRC") algorithm, such as, for example, a CRC 32 algorithm, to generate the fingerprint.

The fingerprint is provided to the host system (at 304). For example, the security measure 118 associated with the software application 116 can provide the fingerprint to the host system 108 via the network 106.

The validity of the fingerprint can be checked (at 306). For example, the host system 108 can determine the validity of the fingerprint using crowd-sourced fingerprints. For example, the host system 108 can store fingerprints that are received from other user devices and can compare the fingerprint received at 304 to the set of stored fingerprints. The stored fingerprints can include fingerprints associated with sandbox environment executing the software application 116 and received from various types of user devices that are executing various operating systems. For example, the stored fingerprints can include fingerprints received from a Samsung Galaxy phone executing a first version of the Android operating system and a version of the software application associated with the first version of the Android operating system, a second Samsung Galaxy phone executing a second version of the Android operating system and a version of the software application associated with the second version of the Android operating system, multiple versions of Motorola's Droid smartphone executing a first version of the Android operating system and a version of the software application associated with the first version of the Android operating system, multiple versions of Motorola's Droid smartphone executing a second version of the Android operating system and a version of the software application associated with the second version of the Android operating system, multiple versions of Apple's iPhone executing iOS 5.1 and a version of the software application associated with iOS 5.1 and multiple versions of Apple's iPhone executing a different iOS version and a version of the software application associated with the version iOS.

In one implementation, the host system 108 stores an association, e.g., in a relational database, between an identification code for each user device 102 and the fingerprint received for that mobile device. The host system 108 can calculate a relative frequency for any particular fingerprint, e.g., the number or percentage of devices that have a fingerprint that is identical to the particular fingerprint. Since the fingerprints are generated based on the content of the sandboxed environment, fingerprints generated from user devices that are the same and are executing the same operating system and the same version of the software application 116 should match (e.g., fingerprints should be similar or identical). For example, if two user devices are both iPhones and are executing the same version of iOS and the same version of the software application 116, then the fingerprints associated with the two user devices should be identical. Since compromised devices constitute a very small percentage of the total number of devices, the fingerprints associated with normally operating devices should have a significantly higher relative frequency.

When the host system 108 receives a fingerprint from the mobile device 102, the host system 108 analyzes the received fingerprint and body of fingerprints to find anomalies. For example, the host system can determine the relative frequency of the received fingerprint as compared to fingerprints received across mobile devices from an install base (e.g., across user devices that are the same and executing the same operating system and version of the software applications), and compare the relative frequency to a threshold value. If the relative frequency is above a threshold value, then the host system 108 can determine that the fingerprint is valid. If the relative frequency is below the threshold value, then the host system 108 can determine that the fingerprint is invalid. The predetermined threshold can be based on the number of stored fingerprints.

If the fingerprint is determined to be invalid, the security measure can perform a corrective measure (at 308) as described above in connection with FIG. 2. For example, the security measure 118 can deauthorize the software application such that the software application no longer is able to interact with the host system 108 and/or continue to operate. In addition, the security measure 118 can wait until a predetermined amount of time or a random/pseudo-random amount of time has elapsed before executing the corrective measure.

Figure 4:
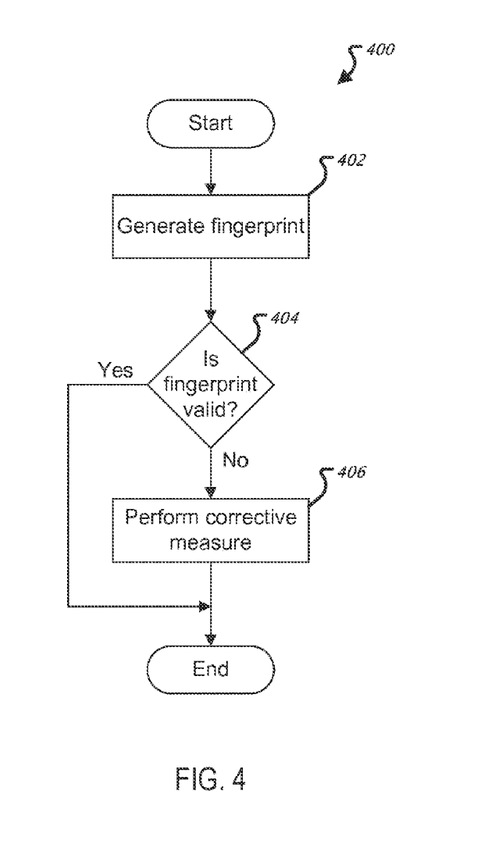
FIG. 4 is a flowchart of an example process for determining whether an application has been compromised.

Returning to FIG. 2, the process 200 can then determine whether the software application has been compromised, e.g., whether the software application has been modified (at 206). For example, the security measure 118 can calculate a fingerprint for the software application 116. An example process 400 to determine whether the software application 116 has been compromised is illustrated in FIG. 4.

Process 400 begins by generating a fingerprint for the software application (at 402). For example, the security measure 118 can calculate a fingerprint of the software application 116 using various error detection techniques. For example, the security measure 118 can apply a CRC algorithm, such as, for example, a CRC 32 algorithm, to the software application 116 to generate the fingerprint.

The security measure can then determine if the fingerprint is valid (at 404). For example, the security measure 118 can compare the fingerprint to a stored fingerprint that was generated by the manufacturer or producer of the software application 116. The stored fingerprint can be included in the application 116 when the application is distributed or installed on the user device 102. If the fingerprint and the stored fingerprint are identical or substantially identical, then the security measure 118 can determine that the software application 116 has not been compromised.

If the fingerprint and the stored fingerprint are not identical or substantially identical, then the security measure 118 can determine that the software application 116 has been compromised and perform a corrective measure (at 406) as described above in connection with FIG. 2. For example, the security measure 118 can deauthorize the software application such that the software application no longer is able to interact with the host system 108 and/or continue to operate. In addition, the security measure 118 can wait until a predetermined amount of time or a random/pseudo-random amount of time has elapsed before performing the corrective measure.

Figure 5:
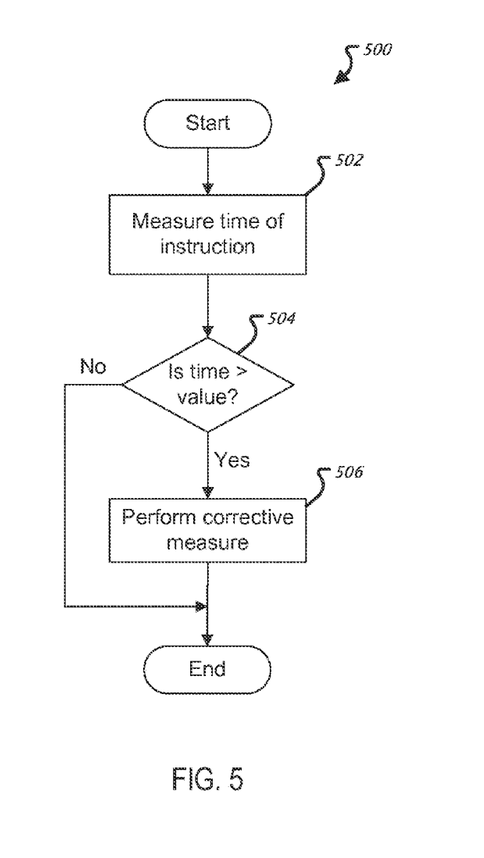
FIG. 5 is a flowchart of an example process for determining whether the debugging mode is active.

Returning to FIG. 3, the process 300 can then determine whether a debugging mode associated with the user device has been initiated (at 208). For example, the process 300 can instruct the operating system 114 not to permit a debugger to attach to the application 116. The process 300 can detect insertion of debugging code into a software application based on fingerprints of the user device. The initiation of the debugging mode can be an indication that the application 116 and/or the operating system 114 are being attacked or an indication of an attempt to compromise the operating system 114 or the application 116. An example process 500 to determine whether a debugging mode has been initiated is illustrated in FIG. 5.

Process 500 begins by performing an instruction and measuring the time needed to perform the instruction (at 502). For example, the software application 116 can perform a predetermined software routine or execute a predetermined instruction (e.g., a memory access, a calculation, or a comparison) and measure the time needed to complete the routine or instruction.

The measured time can be compared to a predetermined value (at 504). The predetermined value can be determined based on an expected amount of time needed to perform the instruction/routine. For example, the manufacturer or developer of the software application can determine an expected amount of time needed to perform the predetermined instruction/routine using different user devices and different operating systems (e.g., an Android based phone, a fourth generation iPhone executing iOS 4.0 and a fourth generation iPhone executing iOS 5.1, etc). If the measured time is less than the predetermined value, the security measure 118 can determine that the debugging mode has not been initiated.

If the measured time is greater than the predetermined value, the security measure 118 can determine that the debugging mode has been initiated and is active (at 504). In response, as described above, the security measure 118 can perform a corrective measure (at 506) as described above in connection with FIG. 2. For example, the security measure 118 can deauthorize the software application such that the software application no longer is able to interact with the host system 108 and/or continue to operate. In addition, the security measure 118 can wait until a predetermined amount of time or a random/pseudo-random amount of time has elapsed before performing the corrective measure.

Figure 6:
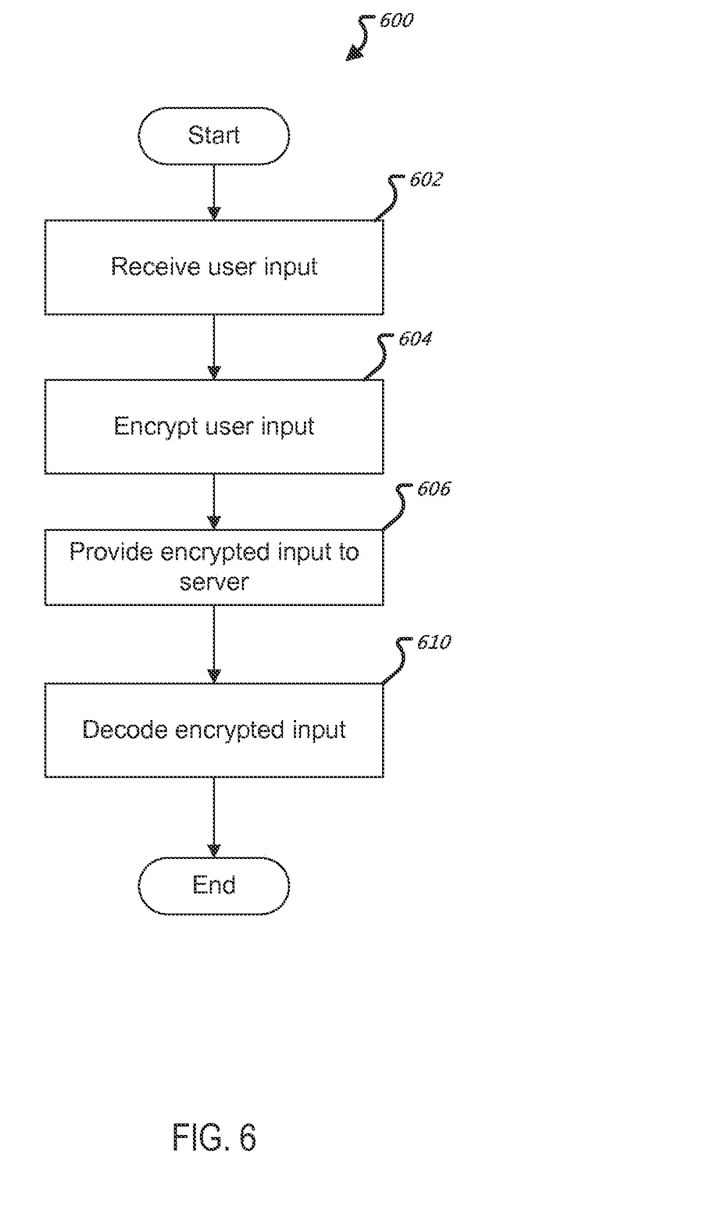
FIG. 6 is an illustration of an example process for providing data security.

FIG. 6 is an illustration of an example process 600 for providing data security. Process 600 begins by receiving a user input (at 602). For example, a software application, e.g., a mobile payment application, can receive user input via a touch screen included in the user device 102. The user input can be an entry of a first character or number of a user's password or PIN. The user input can be in the form of coordinates associated with the touch screen that indicate the location of the user's input (e.g., the location at which the user's finger or stylus makes contact with the touch screen). The coordinates can be mapped to an onscreen number pad and can be translated to identify a digit or character that corresponds to the user's input.

In response to receiving the user input, the application 116 can encrypt the user input (at 604). For example, the security measure 118 can use various encryption techniques, such as, for example, an Advanced Encryption Standard ("AES") cipher, a Data Encryption Standard ("DES") cipher, an RSA encryption algorithm, and so on, to encrypt the received coordinates.

The encrypted input can be provided to the host system 108 (at 606). For example, the application 116 can transmit the encrypted coordinates to the host system 108 via the network 106.

The host system 108 can then store the encrypted input and decrypt the encrypted input (at 610). For example, the host system 108 can store the encrypted input and decode the encrypted input using the decryption algorithm corresponding to the encryption algorithm. In some implementations, the encrypted input is decoded after the entire password or PIN has been received.

By encrypting the coordinates as the user input is received and decrypting the coordinates on the host system 108, data security can be improved. For example, the unencrypted coordinates would not be stored in memory included in the user device 102 (e.g., the allocated memory 124a) and this can prevent a malicious application from attempting to access the coordinates in memory.

Figure 7:
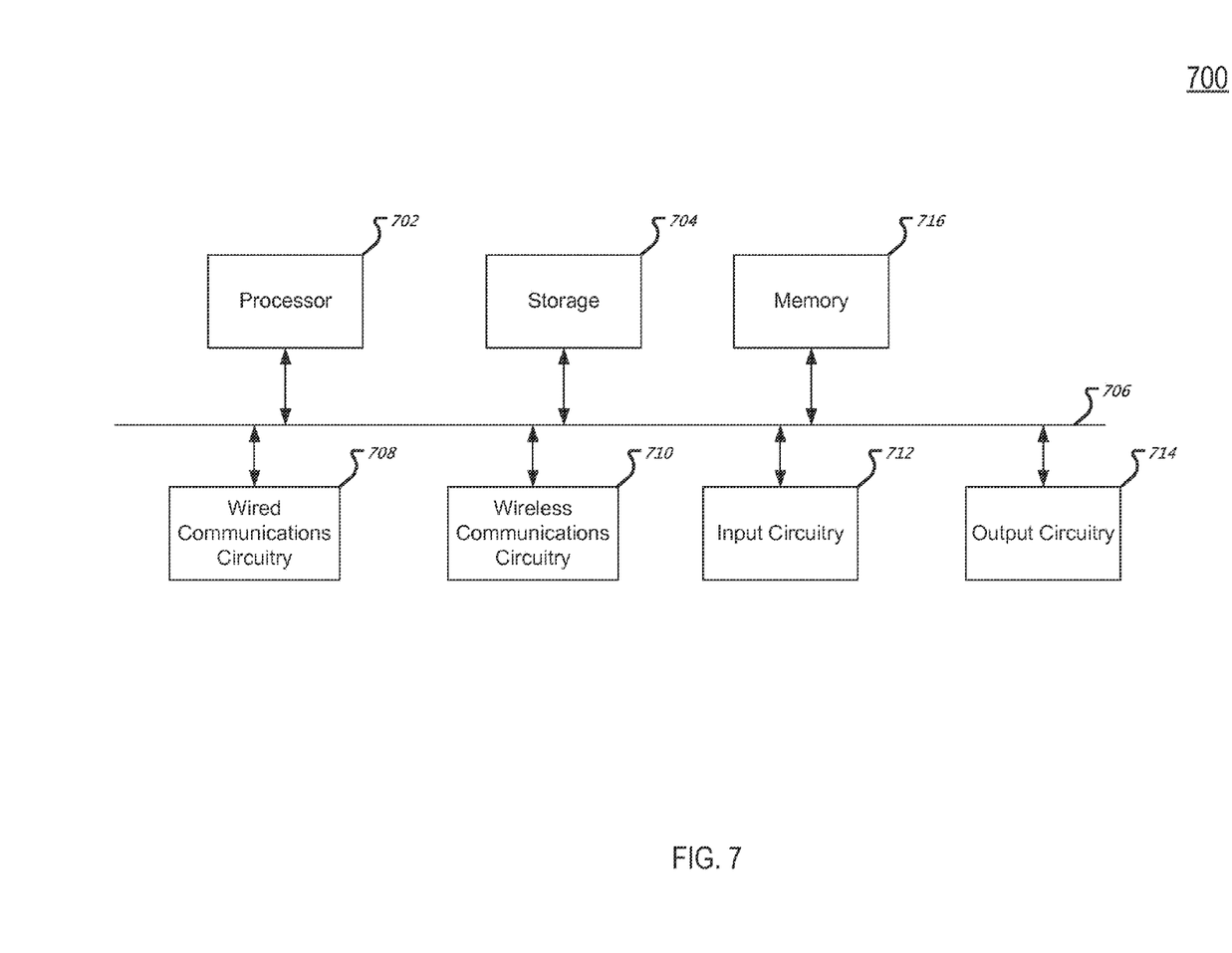
FIG. 7 is a block diagram of an exemplary electrical device.

FIG. 7 shows a simplified schematic diagram of an exemplary electrical device or devices in accordance with some embodiments of the present invention. Apparatus 700 can be implemented in or as any type of electrical device or devices, such as, for example, handheld device 102 and/or electrical device 202 discussed above. In some embodiments, the circuitry of apparatus 300 could be implemented, for example, using a multi-chip module including two or more separate integrated circuits.

Apparatus 700 can be configured to request, receive, store and/or present one or more types of data (e.g., text, video, audio, image, etc.) to a user and/or other device. Data that represents video, images, and/or audio is sometimes referred to herein as media. Additional data, such as descriptive text data associated with media is sometimes referred to herein as metadata. Apparatus 700 can be integrated into or can be any type of portable, fixed, and/or mobile device, including but not limited to a laptop computer, a desktop computer, an audio player (e.g., walkman, compact disc player, etc.), a video player, a media player (e.g., an iPod™ sold by Apple Inc. of Cupertino, Calif., etc.), a television set top box (such as, e.g., an Apple TV™), a portable video game system (e.g., Sony's PSP, Nintendo's Game Boy, etc.), an electronic book, a cellular telephone, a wireless telephone, a hand held computer, a GPS device, a flashlight, a personal digital assistant (PDA) (e.g., Palm Pilot, etc.), a wireless headset for a telephone, a satellite radio, a remote control, an automobile key fob, a printer, an automobile radio, an automobile computing system, a watch, a surge protector, an AC/DC converter, etc., or any combination thereof.

Apparatus 700 can include (but is not limited to) one or more of the following components: processor 702, storage 704, bus 706, wired communications circuitry 708, wireless communications circuitry 710, input circuitry 712, output circuitry 714 and memory 716. One skilled in the art would appreciate that apparatus 700 can also include additional components that are not shown in FIG. 7 (such as, e.g., at least one user input interface, etc.), that the components shown in FIG. 7 could be combined with one another and/or with components that are not shown in FIG. 7, and that the components shown in FIG. 7 can represent one or more components (e.g., wireless communications circuitry 710 can represent the components necessary for WiFi, Bluetooth, and/or cellular telephone communications.

Processor 702 can be configured to control the operation of apparatus 700. For example, processor 702 can control wired communications circuitry 708 and/or wireless communications circuitry 710, thereby enabling apparatus 700 to communicate with one or more other devices (such as, e.g., data servers). These communications can be used to, for example, verify the authenticity of apparatus 700 to one or more servers, verify the authenticity of one or more other devices, receive a direct input (from, e.g., a USB drive) using input circuitry 712, request and receive media from one or more servers, and/or provide data to a display device using output circuitry 714. Processor 702 can, for example, stream data directly from an interface component (e.g., wired communications circuitry 708, wireless communications circuitry 710, input circuitry 712, etc.) to output circuitry 714 and/or store data in storage 704 and/or memory 716.

Storage 704 can be configured to store data, including media, configuration data for apparatus 700, metadata, operating instructions, etc. Storage 704 can be any type of non-volatile storage, including a hard disk device, flash memory, a solid-state drive, etc. For example, media or any other data received from a remote server can be stored on storage 704. The data can then be locally accessed and processed by, e.g., processor 702. Further, configuration information, such as the resolution of a coupled display device or information identifying an associated media server, can be stored on storage 704. Additionally, storage 704 can include operating instructions executed by processor 702 for controlling operation of the media processing device 100. For example, storage 704 can be divided into a plurality of partitions, wherein each partition can be utilized to store one or more types of information and can have custom access control provisions.

Bus 706 couples the components of apparatus 700 together. Bus 706 can be configured to permit unidirectional and/or bidirectional communications between the components of apparatus 700. For example, processor 702 can retrieve information from and transmit information to storage 704 over bus 706. Bus 706 can include, for example, a plurality of buses, each of which couples at least one component of apparatus 700 to another component of apparatus 700 or to a device external to apparatus 700.

The input, output and communications components of apparatus 700 can be used for communicating with other devices, including media servers and presentation devices. Wired communications circuitry 708 and wireless communications circuitry 710 each can be configured to permit apparatus 700 to transmit and receive information over a network, such as a local area network (LAN), the Internet, etc. Additionally, input circuitry 712 can be configured to receive an input from another device through a direct connection, which may be a wired/physical connection (e.g., USB, IEEE 1394, etc.) or wireless connection (e.g., infrared, etc.).

Other types of input interfaces, which are not shown in FIG. 7, may also be implemented in apparatus 700. For example, an input interface may use touch-based operations, near-contact operations, speech-based operations, operations based on tracking a user's eyes or physical presence, any other type of input, or an combination thereof. An input interface, such as a remote control for example, can utilize any type of sensor(s) to generate one or more input signals based on receiving, for example, physical stimuli (e.g., a touch event). In some embodiments, apparatus 700 can include or be coupled to a keyboard and/or one or more other suitable input components (e.g., mouse, trackball, stylus, touch screen, etc.), or any combination thereof. The input components and devices that can be used in conjunction with some embodiments of the present invention are represented in FIG. 7 by circuitry 712, which can be configured to convert any type of physical stimuli into corresponding electrical (digital and/or analog) signal(s). One skilled in the art would appreciate that a plurality of input circuitry can be used in connection with the invention and that circuitry 712 is shown as being singular to avoid overcomplicating the drawing.

Apparatus 700 also can comprise output circuitry 714 that can be used to output data and/or information from apparatus 700 to one or more external devices, including, for example, a television, a monitor, an audio receiver, and/or one or more speakers. Output circuitry 714 can be, for example, one or more of an optical audio interface, an RCA connector interface, a component video interface, a High-Definition Multimedia Interface (HDMI), coaxial cable, or any other port(s) used to pass data from apparatus 700 to another device or component. In embodiments, output circuitry 714 can be used to provide a first type of signal, such as an audio stream, to a first device and another type of signal, such as a video stream, to a second device. Output circuitry 714 can also include driver circuitry of at least one integrated or other display screen or device, speaker, telephone ringer, vibration component, any other component or device, or any combination thereof. Like any other component discussed herein, output circuitry 714 may need to be configured, either automatically or manually, and/or require certain software/firmware before being used as discussed herein.

Apparatus 700 also can comprise memory 716, which can be, for example, random access memory (RAM), read only memory (ROM) and/or any other type of data storage device. As with storage 704, a plurality of types of data can be stored in memory 716, including the types of data discussed above as well as, for example, software that is implemented in apparatus 700. One skilled in the art would appreciate that various components of apparatus 700 can be combined or subdivided without departing from the spirit of the present invention. For example, a portion of storage 704 can be allocated to act as memory 716, which may or may not allow memory 716 to be omitted from apparatus 700.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple COs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the disclosed subject matter or of what may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   determining, by a host computer system, that a first security measure in a mobile device separate from the host computer system has been compromised by malicious software, wherein the first security measure is a software routine or library that protects sensitive information associated with a user of the mobile device, and wherein said determining includes detecting a triggering feature of the malicious software;
   determining, by the host computer system, a corrective measure against the malicious software to be executed by the mobile device, wherein the corrective measure includes deauthorization of an application executing on the mobile device to prevent malicious communication with an operating system of the mobile device, the host computer system, or both;
   calculating, by the host computer system, a delay to be applied before execution of the corrective measure; and
   causing, by the host computer system, execution of the corrective measure to occur only after a time period corresponding to the delay has passed since detection of the triggering feature.

2. The method of claim 1, wherein the time period is a predetermined amount of time.

3. The method of claim 2, wherein the predetermined amount of time corresponds to a predetermined number of requests from the mobile device or a pseudo-random number of requests from the mobile device.

4. The method of claim 1, wherein the time period is a pseudo-random amount of time.

5. The method of claim 1, further comprising receiving, by the host computer system, a type of security failure, wherein calculating the delay is based on the type of security failure.

6. The method of claim 1 further comprising:
determining that a second security measure in the mobile device has been compromised by the malicious software, wherein the first security measure and the second security measure are part of a hierarchy of security measures in which the second security measure is associated with a higher level of security than the first security measure.

7. The method of claim 6, wherein determining that the second security measure has been compromised includes receiving an indication from the mobile device that an application in the mobile device can access a memory location outside of allocated memory for the application.

8. The method of claim 6, wherein determining that the second security measure has been compromised includes determining that one or more stored fingerprints include less than a threshold number of fingerprints identical to a first fingerprint received from the mobile device.

9. The method of claim 6, wherein determining that the second security measure has been compromised includes determining that a fingerprint of an application on the mobile device does not match a stored fingerprint for the application.

10. The method of claim 6, wherein determining that the second security measure has been compromised includes receiving an indication from the mobile device that a debugging mode is active.

11. The method of claim 1, wherein the corrective measure comprises at least one of disabling an account associated with the user, disabling an account associated with the mobile device, or performing risk evaluation.

12. A processing system comprising:
communication circuitry to enable the processing system to communicate with a remote mobile device via a network;
a processor coupled to the communication circuitry; and
a computer-readable medium coupled to the processor and having instructions stored thereon, which, when executed by the processor, cause the processing system to perform operations including:
determining that a first security measure of an operating system in the remote mobile device has been compromised by malicious software, where the first security measure is a software routine or library that protects sensitive information associated with a user of the mobile device, and where said determining includes detecting a triggering feature of the malicious software;
determining a corrective measure against the malicious software to be executed by the mobile device, wherein the corrective measure includes deauthorization of an application executing on the remote mobile device to prevent further communication with the operating system, the processing system, or both;
calculating a delay to be applied before execution of the corrective measure, where the delay impedes recognition of a causal relationship between the triggering feature and the corrective measure; and
causing execution of the corrective measure to occur only after a time period corresponding to the delay has passed since detection of the triggering feature.

13. The processing system of claim 12, wherein the time period is a predetermined amount of time.

14. The processing system of claim 13, wherein the predetermined amount of time corresponds to a predetermined number of requests from the remote mobile device or a pseudo-random number of requests from the remote mobile device.

15. The processing system of claim 12, wherein the time period is a pseudo-random amount of time.

16. The processing system of claim 12, wherein said operations further comprise receiving a type of security failure, wherein calculating the delay is based on the type of security failure.

17. The processing system of claim 12, wherein said operations further comprise:
determining that a second security measure in the remote mobile device has been compromised by the malicious software, wherein the first security measure and the second security measure are part of a hierarchy of security measures in which the second security measure is associated with a higher level of security than the first security measure.

18. The processing system of claim 17, wherein determining that the second security measure has been compromised includes receiving an indication from the remote mobile device that an application in the remote mobile device can access a memory location outside of allocated memory for the application.

19. The processing system of claim 17, wherein determining that the second security measure has been compromised includes determining that one or more stored fingerprints include less than a threshold number of fingerprints identical to a first fingerprint received from the remote mobile device.

20. The processing system of claim 17, wherein determining that the second security measure has been compromised includes determining that a fingerprint of an application on the remote mobile device does not match a stored fingerprint for the application.

21. The processing system of claim 17, wherein
determining that the second security measure has been compromised includes receiving an indication from the remote mobile device that a debugging mode is active.

22. A non-transitory machine-readable storage medium storing instructions that, when executed by a host processing system, cause the host processing system to perform operations comprising:
receiving a type of security failure associated with a mobile device separate from the host computer system;
determining that a first security measure in the mobile device has been compromised by malicious software, wherein the first security measure is implemented by an operating system or an application executing on the mobile device, and wherein said determining includes detecting a triggering feature of the malicious software;
determining a corrective measure against the malicious software to be executed by the mobile device, wherein the corrective measure includes deauthorization of the application executing on the mobile device to prevent malicious communication with the operating system, the host processing system, or both;
calculating a delay to be applied before execution of the corrective measure, based on the type of security failure; and causing execution of the corrective measure to occur only after a time period corresponding to the delay has passed since detection of the triggering feature.

23. The non-transitory machine-readable storage medium of claim 22, wherein said determining that the first security measure in the mobile device has been compromised by the malicious software comprises:
   receiving a fingerprint of a sandbox environment in which a software application associated with the host processing system operates; and
   checking validity of the fingerprint by comparing the fingerprint to a set of stored fingerprints that are received from other mobile devices.

* * * * *